United States Patent
Rauch et al.

(10) Patent No.: US 7,032,885 B2
(45) Date of Patent: Apr. 25, 2006

(54) THROTTLE BODY AND METHOD OF ASSEMBLY

(75) Inventors: James Richard Rauch, Grass Lake, MI (US); Richard Eugene Tyzo, West Bloomfield, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 49 days.

(21) Appl. No.: 10/898,493

(22) Filed: Jul. 22, 2004

(65) Prior Publication Data

US 2006/0017036 A1 Jan. 26, 2006

(51) Int. Cl.
*F16K 31/00* (2006.01)

(52) U.S. Cl. .................... 251/308; 251/305
(58) Field of Classification Search ........ 251/305, 251/306, 308
See application file for complete search history.

(56) References Cited

U.S. PATENT DOCUMENTS

| | | | |
|---|---|---|---|
| 2,704,681 A | 3/1955 | Fischer | |
| 3,262,671 A * | 7/1966 | Muench | 251/163 |
| 3,391,954 A | 7/1968 | Callahan | |
| 3,471,121 A * | 10/1969 | Geiselman | 251/308 |
| 3,730,641 A | 5/1973 | Gordon | |
| 3,838,928 A | 10/1974 | Blaurock et al. | |
| 4,022,424 A * | 5/1977 | Davis et al. | 251/214 |
| 4,195,944 A | 4/1980 | Cross | |
| 4,275,867 A * | 6/1981 | Schils | 251/297 |
| 4,462,567 A * | 7/1984 | Habicht | 251/297 |
| 4,508,068 A | 4/1985 | Tuggle et al. | |
| 4,509,720 A | 4/1985 | Griffin et al. | |
| 4,603,886 A | 8/1986 | Pallini, Jr. | |
| 4,611,837 A | 9/1986 | Aleck | |
| 4,651,763 A * | 3/1987 | Scobie et al. | 137/13 |
| 4,790,683 A | 12/1988 | Cramer, Jr. et al. | |
| 4,828,423 A | 5/1989 | Cramer, Jr. et al. | |
| 4,860,706 A | 8/1989 | Suzuki et al. | |
| 4,881,842 A | 11/1989 | Farrell et al. | |
| 5,121,605 A | 6/1992 | Oda et al. | |
| 5,176,413 A | 1/1993 | Westman | |
| 5,188,078 A | 2/1993 | Tamaki | |
| 5,370,361 A * | 12/1994 | Mendell et al. | 251/307 |
| 5,499,884 A | 3/1996 | Kuhnhold et al. | |
| 5,667,332 A | 9/1997 | Lindholm | |
| 5,822,984 A * | 10/1998 | Park | 60/288 |
| 6,206,024 B1 * | 3/2001 | Naberhaus | 137/15.24 |
| 6,349,701 B1 | 2/2002 | Sakurai et al. | |
| 6,581,569 B1 | 6/2003 | Arsic et al. | |
| 6,691,678 B1 | 2/2004 | Hashimoto et al. | |
| 2003/0095728 A1 | 5/2003 | Dorulla et al. | |
| 2003/0126916 A1 | 7/2003 | Kure | |

* cited by examiner

*Primary Examiner*—J. Casimer Jacyna
(74) *Attorney, Agent, or Firm*—MacMillan, Sobanski & Todd LLC

(57) ABSTRACT

A throttle body for an automobile and a method of assembly of a throttle body are provided. The throttle body includes a throttle shaft defining a rotational axis, a housing having a bore, a deformable member located on the throttle shaft and at least partially-located within the bore, and a bearing having an inner surface and an outer surface. The bearing inner surface forms a press-fit connection with the deformable member to substantially prevent movement between the throttle shaft and the bearing in a direction parallel to the rotational axis.

20 Claims, 4 Drawing Sheets

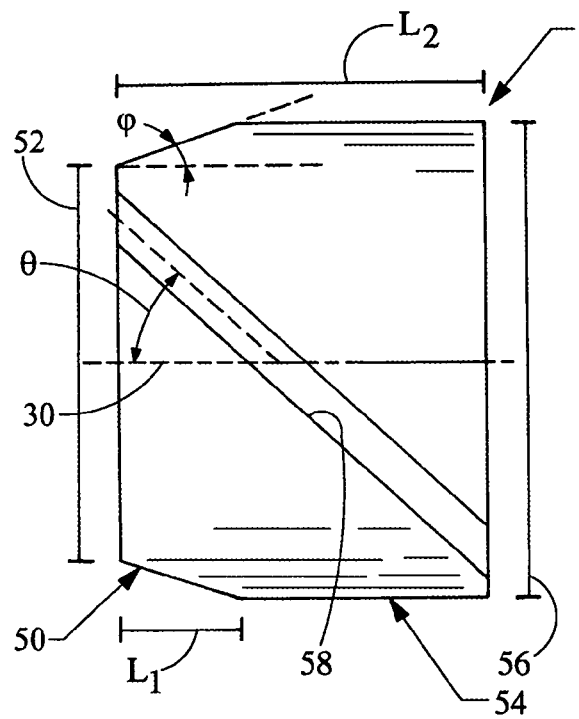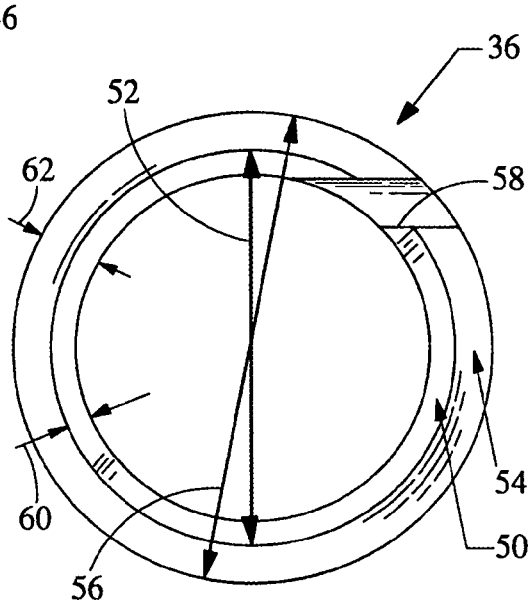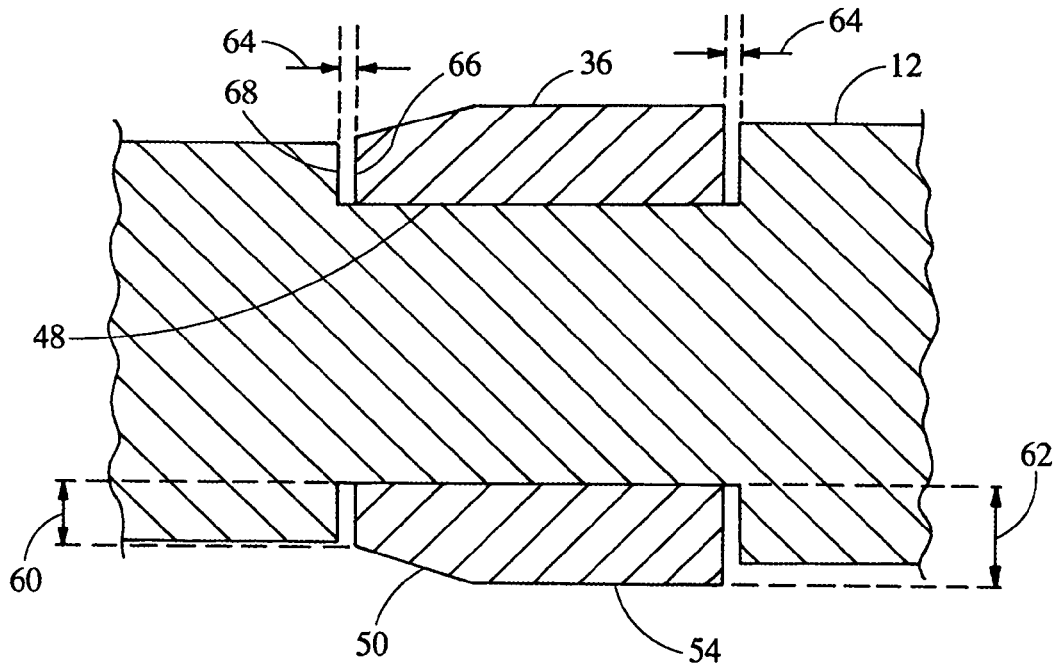
Fig. 3A
Fig. 3B
Fig. 4

THROTTLE BODY AND METHOD OF ASSEMBLY

BACKGROUND

1. Field of the Invention

This invention generally relates to an air intake control device. More specifically, the invention relates to a throttle body and a method of assembling a throttle body.

2. Related Technology

Throttle bodies regulate the airflow to an internal combustion engine. In order to run properly, internal combustion engines require a precise mixture of air and gasoline and, therefore, throttle bodies are designed to adjustably control the airflow into the cylinders of the engine. In order to control the airflow that reaches the cylinders, the throttle body includes at least one throttle plate attached to a throttle shaft such that the throttle plate is located within a throttle bore, or proximal to an end of the throttle bore. With rotation of the shaft, the throttle plate is able to selectively obstruct airflow through the throttle bore. More specifically, the throttle plate is able to rotate with respect to the bore in order to adjust the cross-sectional area of the bore that is not obstructed by the plates (the "effective area"), thus controlling the amount of airflow that is permitted to flow through the throttle bore.

In order to effectively control the effective area, the throttle plate is sized and shaped to approximate the cross-sectional area of the bores so as to substantially or completely obstruct the bore when the throttle plate is perpendicular to the airflow (the "dosed position"). Additionally, the throttle plate has a minimal thickness in order to substantially not obstruct the throttle bore when the plate is angled such that a throttle plate is not substantially perpendicular to the airflow (the "open position").

During operation, if the engine is idling, only a little air is needed to mix with the small amount of fuel being injected into the engine. When the engine is idling, the throttle plate is therefore in the closed position. Conversely, if the engine is operating at a speed higher than idle, then more air is needed to mix with the increased amount of fuel being provided to the engine. At speeds higher than idle, the throttle plate is therefore in an open position of a varying angle with respect to the airflow, the angle varying within the air requirements.

In order to completely or substantially obstruct the bore when the throttle plate is the closed position, it is desirable for the throttle plate to be precisely sized and accurately located within the bore.

Furthermore, it is desirable for the throttle plate to be secured in the direction parallel to the rotational axis of the throttle shaft (referred to as the longitudinal direction). This minimizes or prevents unwanted contact between the throttle plate and the bore inner surface. Contact between the throttle plate and the bore inner surface may prevent the throttle plate from fully closing. Furthermore, contact may cause excessive friction between moving parts and premature part failure. The control of the longitudinal movement of the throttle plate is hereinafter referred to as float control.

In order to improve float control, some currently-used throttle bodies include a first press-fit connection between the throttle shaft and an inner race of a bearing, and a second press-fit connection between the outer race of the bearing, and the throttle body housing. However, the first press-fit connection may deform the throttle shaft during periods of assembly or maintenance of the throttle body. Throttle shaft deformation is undesirable because it may prevent the throttle shaft from being reusable after assembly or maintenance, thus potentially increasing assembly and/or service costs.

Another float control method includes an assembly for longitudinally trapping the inner race of the bearing in a predetermined position on the throttle shaft. More specifically, the inner race is sandwiched between a first structure, such as a threaded nut, on a first longitudinal side of the bearing and a second structure, such as a stepped-diameter of the throttle shaft, on a second longitudinal side of the bearing. However, this type of float control construction may require complicated machining operations and part requirements.

Yet another float control method includes an clip located in a groove for longitudinally trapping the inner race of the bearing in a predetermined position on the throttle shaft. More specifically, the clip is seated in a groove such as to contact the bearing on a first longitudinal side and such that the second longitudinal side of the bearing contacts the housing. However, this type of float control construction may require complicated machining operations and may result in undesirable, high-frictional contacts between the respective structures and the bearing.

Therefore, it is desirous to minimize both the longitudinal movement of the throttle shaft and the friction between moving parts, all while reducing the manufacturing and assembly costs and complexities of the throttle body.

SUMMARY

In overcoming the disadvantages and drawbacks of the known technology, the current invention provides a throttle body for an automobile and a method of assembly of a throttle body. The throttle body includes a throttle shaft defining a rotational axis, a housing having a bore, a deformable member located on the throttle shaft and at least partially-located within the bore, and a bearing having an inner surface and an outer surface. The bearing inner surface forms a press-fit connection with the deformable member to substantially prevent movement, in a direction parallel to the rotational axis, between the throttle shaft and the bearing.

In one configuration, the deformable member is at least partially located within a groove formed on the throttle shaft. Across the width of the groove, the groove may have a substantially constant diameter. Furthermore, the groove in this configuration may exhibit a taper, thus having a first diameter at a first point along the rotational axis and a second diameter at a second point along the rotational axis, wherein the second diameter is greater than the first diameter. In this configuration, the first point is located a first distance from the throttle plate; the second point is located a second distance from the throttle plate; and the first distance is greater than the second distance. The deformable member preferably has a substantially uniform thickness.

Additionally, the deformable member may be provided with a tapered exterior surface (at one end) to facilitate mounting of the bearing onto the member. The throttle body may also include a throttle plate connected to the throttle shaft. The tapered exterior of the deformable member is preferably located further from the throttle plate than the non-tapered portion of the deformable member in order to ease assembly of the throttle body.

The deformable member may be shaped as a generally-circular ring. Furthermore, the generally-circular ring may include a slot extending therethrough, obliquely or parallel to the rotational axis.

A method of assembly of a throttle body is also provided by the present invention. The method includes the steps of providing a throttle shaft and a housing having a bore, positioning a deformable member on the throttle shaft, extending at least a portion of the throttle shaft through the bore, providing a bearing having an inner surface and an outer surface, and coupling the bearing inner surface with the deformable member such as to form a press-fit connection. The press-fit connection is such that it prevents movement between the throttle shaft and the bearing in a direction parallel to the rotational axis.

Furthermore, the method may include the step of at least partially inserting the deformable member within a groove of the throttle shaft. As such, the deformable member is positioned between the throttle shaft and the bearing inner surface. The method of one embodiment also includes the step of plastically deforming a portion of the deformable member. The step of coupling the bearing inner surface with the deformable member and the step of plastically deforming a portion of the deformable member may occur substantially simultaneously. Finally, the throttle shaft preferably remains substantially undeformed during the assembly of the throttle body.

BRIEF DESCRIPTION OF THE DRAWINGS

FIG. 3a is a side view of the deformable member of FIG. 1;

FIG. 3b is an axial view of the deformable member of FIG. 3a;

FIG. 4 is a partial view of the deformable member on the throttle shaft;

DETAILED DESCRIPTION

Figure 1:
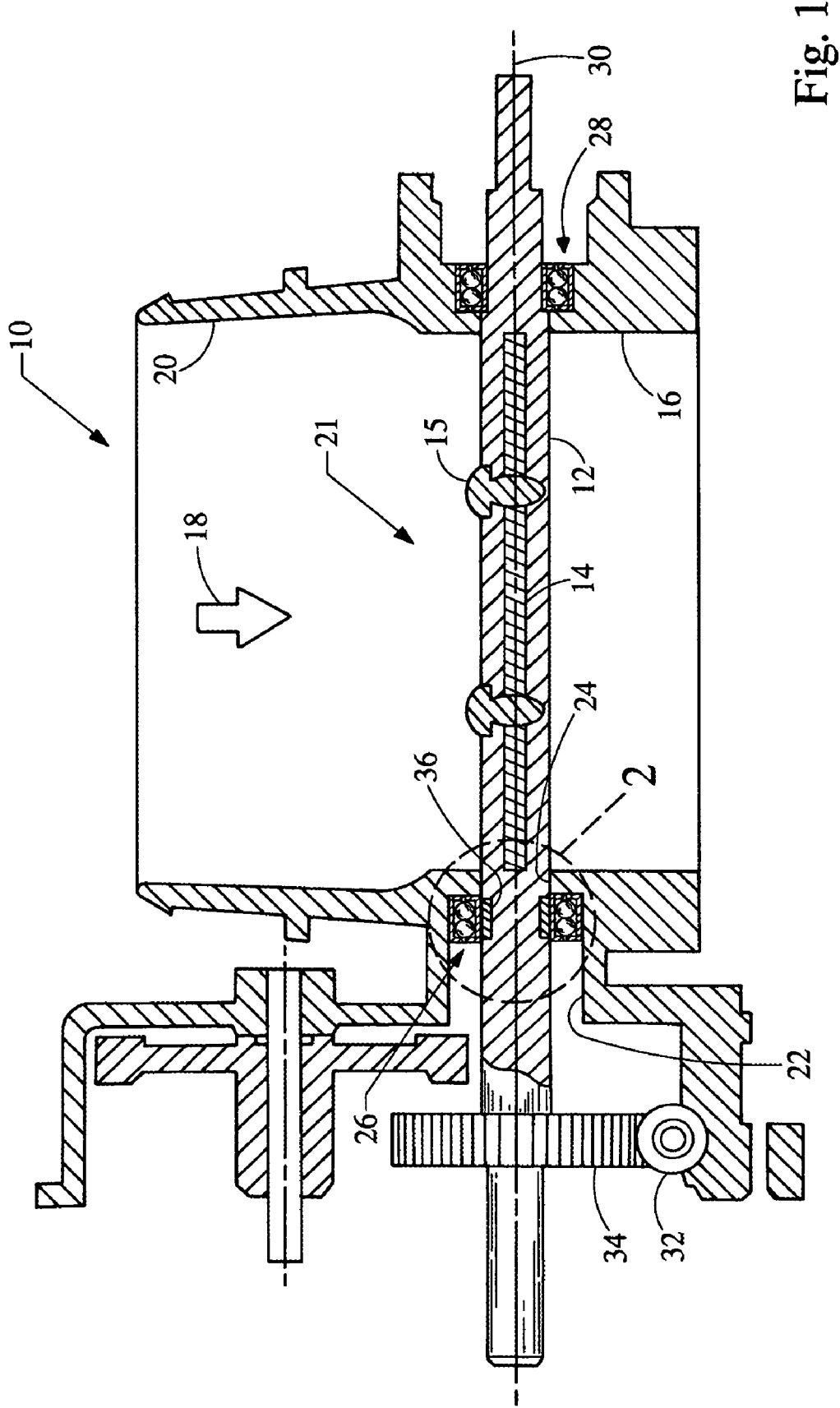
FIG. 1 shows a throttle body embodying the principles of the present invention, including a throttle shaft and a pair of bearings received within a housing, and a deformable member coupled with the throttle shaft and one of the bearings.

Referring now to the present invention, FIG. 1 shows a throttle body 10 used to control the airflow into the combustion cylinders of an internal combustion engine of a motor vehicle. The throttle body 10 includes a throttle shaft 12 connected to a throttle plate 14 by an appropriate means, such as threaded fasteners or rivets 15. The throttle shaft 12 and plate 14 are rotatably received within a housing 16 such that the throttle plate 14 is positioned within a bore 20 receiving the airflow 18. The throttle shaft 12 itself is extended between a pair of bores 24 formed in opposite sides of the airflow bore 20.

During operation of the throttle body 10, the airflow 18 enters the bore 20 which is partially or fully obstructed by the throttle plate 14 and/or throttle shaft 12. More specifically, the throttle plate 14 preferably has a size and shape placing its perimeter in close fit within that of the bore 20 in order to completely block the airflow 18 when the throttle plate.18 is in a closed position (where the axial faces of the throttle plate 14 are generally perpendicular to the airflow 18 through the bore 20, as shown in FIG. 1). As the throttle plate 14 is rotated with respect to the housing 16, openings (not shown) are formed between the perimeter of the throttle plate 14 and the bore 20, which permit the airflow 18 to flow past the throttle plate 14 and into the cylinders of the internal combustion engine. The amount of the airflow 18 that is permitted to flow past the throttle plate 14 increases as the throttle plate is rotated towards an open position (where the axial faces of the throttle plate 14 are not perpendicular to the airflow 18 and more and more closer to parallel within the airflow 18).

The throttle shaft 12 is rotatably received by the bores 24 of the housing 16. More specifically, a pair of bearings 26, 28 preferably receive the throttle shaft 12 on opposite sides of the housing 16 in order to permit the throttle shaft 12 to rotate about a rotational axis 30 defined longitudinally therethrough. The rotation of the throttle shaft 12 is preferably controlled by an automated mechanism, such as an actuator driving a drive gear 32 connected to the housing 16 and a driven gear connected or mounted to the throttle shaft 12.

Figure 2:
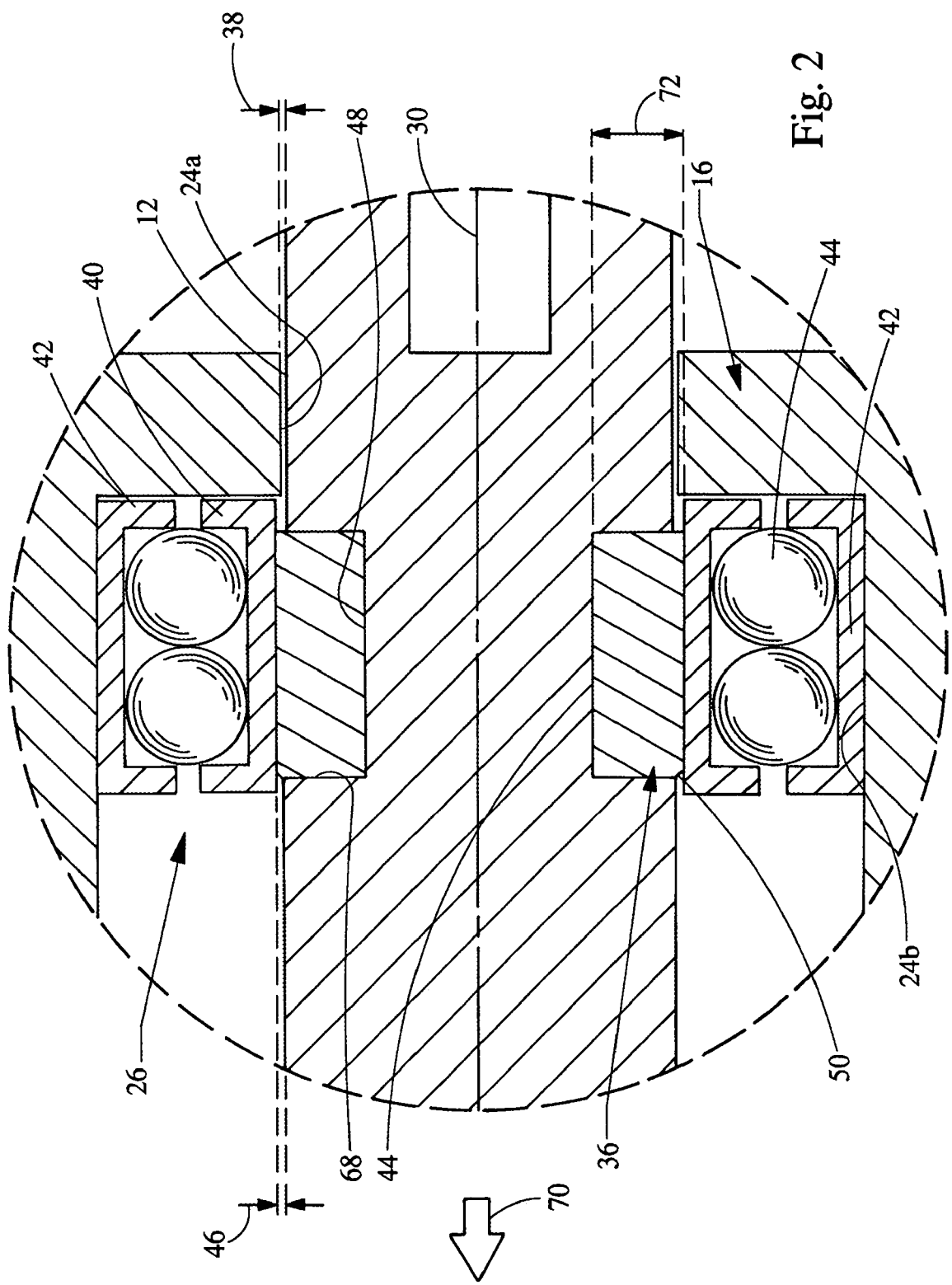
FIG. 2 is an enlarged view of the portion of the throttle body of FIG. 1 encircled by line 2—2.

Referring now to FIG. 2, the throttle shaft 12 preferably extends through a first portion 24a of the bore 24 such that a clearance 38 is present between the bore first portion 24a and the throttle shaft 12. The clearance 38 is preferably of any appropriate size in order to substantially reduce or eliminate frictional contact between the shaft 12 and the bore 24. In order to permit rotational movement between the throttle shaft 12 and the housing 16, the bearing 26 preferably includes an inner race 40 coupled with the throttle shaft 12 and an outer race 42 coupled with the housing 16. The inner race 40 and the outer race 42 are preferably separated by low-friction rolling members, such as the ball bearings 44 shown in FIG. 2.

As discussed above, it is desirable to prevent longitudinal movement of the throttle shaft 12 (where longitudinal motion is defined as being generally parallel to the rotational axis 30 shown in FIG. 1). Therefore, an end float control mechanism is preferably provided. FIG. 2 shows a close-up view of one embodiment of a deformable member 36 utilized in the present invention for float control that is coupled with the bearing 26 and the shaft 12. The deformable member 36 shown in FIG. 2 is referred to as a crush ring 36 and has a generally-circular ring shape, but other configurations may be used.

As discussed above, it is undesirable if deformation to the throttle shaft 12 occurs during assembly and maintenance of the throttle body 10. Therefore, in the present invention the inner race 40 is coupled to the throttle shaft 12 via the crush ring 36. More specifically, the crush ring 36 is located between the throttle shaft 12 and an inner surface 44 of the inner race 40 in order to form a press-fit connection. The press-fit connection between the crush ring 36, the throttle shaft 12, and the bearing 26 is strong enough to substantially prevent movement between the throttle shaft 12 and the bearing 26 in the longitudinal direction. More specifically, the crush ring 36 is plastically deformed by the press-fit connection between the bearing inner race 40 and the throttle shaft 12.

In order to substantially prevent contact between the inner race 40 of the bearing 26 and the throttle shaft 12, a clearance 46 exists between the inner race 40 and the throttle shaft 12. The clearance 46 is any amount sufficient to prevent contact between the inner face 40 and the throttle shaft 12.

The throttle shaft 12 preferably includes a portion having a reduced diameter, such as the groove 48 shown in FIG. 2. The crush ring 36 is located within the groove 48 in order to properly position the crush ring 36 on the throttle shaft 12 with respect to the bearing 26 during assembly and maintenance of the throttle body 10. The groove 48 in FIG. 2 has a shape such as to matingly receive the crush ring 36.

The outer race 42 preferably forms a press-fit connection with a second surface 24b of the bore 24 in order to substantially prevent longitudinal movement between the outer race 42 and the housing 16.

Referring now to FIGS. 3a and 3b, in one configuration the crush ring 36 is a generally-circular ring that substantially encircles the throttle shaft 12. In order for the crush ring 36 to effectively plastically deform when forming a press-fit connection with the throttle shaft 12 and the bearing inner race 40, the material of the crush ring 36 is preferably a relatively soft metal such as aluminum, but any appropriate material may be used.

The configuration shown in FIGS. 3a and 3b includes a tapered end portion 50, having a tapered portion diameter 52, and a straight portion 54, having a straight portion diameter 56. The tapered portion 50 preferably extends across a length $L_1$ parallel to the rotational axis 30 at an angle $\phi$ with respect to a line parallel with the rotational axis 30. The tapered portion diameter 52 varies across the length $L_1$ of the tapered portion 50, while the straight portion diameter 56 is substantially constant. The length $L_1$ of the tapered portion 50 is approximately one-third of the total length $L_2$ of the crush ring 36, but any appropriate length may be used. The angle $\phi$ of the tapered portion 50 is preferably within a range of 5°–45°, but again, any appropriate angle may be used. In order to improve the method of assembly of the throttle body 10, the tapered portion 50 is located adjacent to a lead end of the crush ring 36, as will be discussed in further detail below.

The crush ring 36 includes a slot 58 extending through the crush ring 36 such that the respective diameters 52, 56 of the crush ring 36 are variable. The variable diameters 52, 56 allow the crush ring 36 to be expanded during installation onto the shaft 12 and deform upon press-fitting of the bearing 26, as will be discussed in further detail below. In order to minimize high-pressure contact points between the bearing inner race 40 and the crush ring 36, the slot 58 preferably extends along the length L of the crush ring 36 at an angle substantially oblique to the rotational axis 30. More preferably, the slot 58 forms an angle θ of 15°–60° with the rotational axis 30. Even more preferably, the slot forms an angle θ of approximately 30° with the rotational axis 30. As shown in FIG. 3b, the crush ring 36 in the undeformed state includes a minimum thickness 60 in the tapered portion 50 and a maximum thickness 62 in the straight portion 54.

Referring now to FIG. 4, the details of a method of assembly of a throttle body embodying principles of the present invention will now be discussed. The crush ring 36 is located in the groove 48 of the throttle shaft 12 such as to extend substantially around the throttle shaft 12. In one configuration, the crush ring 36 is located around the shaft by expanding the diameter of a pre-formed crush ring until the slot fits over the throttle shaft 12. In another configuration, a generally flat blank of material is wrapped around the groove of the shaft in order to form a substantially continuous ring. In yet another configuration, the crush ring is a continuous ring that is formed, such as by a molding process, while the blank material is around the throttle shaft. In another configuration, the crush ring is a pre-formed continuous crush ring that is moved down the length of the throttle shaft into a desired position, such as into a groove in the throttle shaft. In this configuration, the diameter of the pre-formed continuous crush ring may be reduced once the crush ring is in the desired position.

After the crush ring 36 has been inserted into the groove 48 and before it has been deformed, the crush ring 36 preferably has a space to expand in the longitudinal direction as it contracts in the radial direction. More specifically, at least one gap 64 is formed between the crush ring 36, a longitudinal end 66 of the crush ring 36, and a respective side wall 68 of the groove 48. The crush ring 36 shown in FIG. 4 is substantially centered within the groove 48 such that the gap 64 is present on each longitudinal end 66 of the crush ring 36.

Referring back to FIG. 2, once the crush ring 36 has been inserted into the groove 48, the throttle shaft 12 is inserted into the bearing 26. During insertion of the throttle shaft 12 into the bearing 26, the crush ring 36 is inserted into the bearing 26 forming a press-fit connection and substantially preventing longitudinal movement between the throttle shaft 12 and the bearing 26 along the rotational axis 30. In order ease the insertion into the bearing 26, the crush ring 36 is preferably inserted into the bearing 26 such that the tapered portion 50 is the lead portion of the crush ring 36 entering the bearing 26.

During insertion of the crush ring 36 and the throttle shaft 12 into the bearing 26, the crush ring 36 is radially compressed to a deformed thickness 72, which is less than the maximum thickness 62 of the undeformed crush ring 36. Depending on the amount of radial deformation that the crush ring 36 undergoes, the tapered portion 50 may be completely compressed such that the crush ring 36 has a substantially constant thickness. Alternatively, a portion of the tapered portion 50 remains undeformed and tapered after insertion into the bearing 26, as shown in FIG. 2. The crush ring 36 preferably expands in the longitudinal direction such as to engage the side walls 68 of the groove 48. The engagement between the crush ring 36 and the groove 48 substantially prevents movement between the throttle shaft 12, the crush ring 36, and the bearing 26.

As discussed above, the clearance 46 between the throttle shaft 12 and the bearing inner race 40 substantially prevents deformation of the throttle shaft 12 during insertion of the crush ring 36 into the bearing 26. Furthermore, the deformation of the crush ring 36 is preferably a plastic deformation in order to form a more effective press-fit connection.

Also during insertion of the crush ring 36 and the throttle shaft 12, a press-fit connection is formed between the outer race 42 of the bearing 26 and the housing 16. The outer race 42 and the housing 16 also preferably form a substantially fluid-tight connection to prevent the airflow 18 from entering the bore 21 formed by the first surface 20 of the housing 16. Similarly, the bearing inner and outer races 40, 42 and the ball bearings 44 also preferably form a substantially fluid-tight connection.

Figure 5:
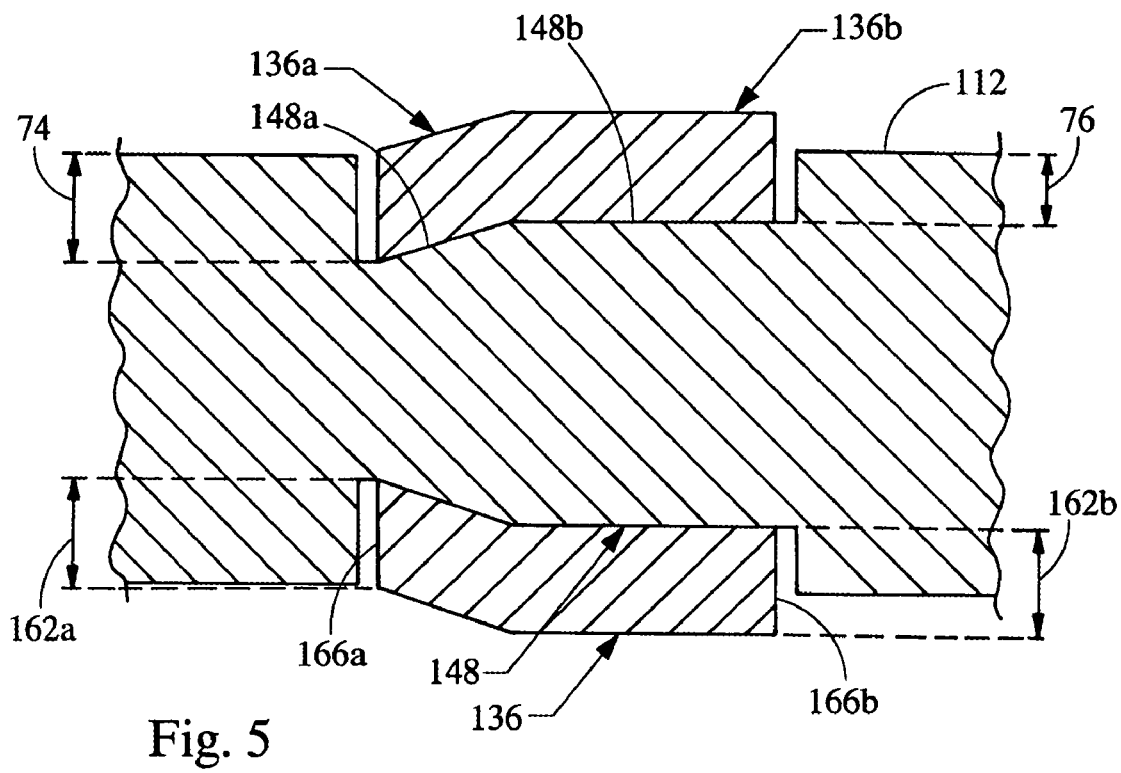
FIG. 5 is an alternative embodiment of a throttle shaft and a deformable member embodying the principles of the present invention.

Referring now to FIG. 5, an alternative configuration of a throttle body embodying the principles of the present invention will now be discussed. The throttle shaft 112 shown in FIG. 5 includes a groove 148 having a varying depth. More specifically, the groove 148 includes a tapered portion 148a having a varying groove depth 74 and a straight portion 148b having a constant groove depth 76. The tapered portion 148a preferably has a length of approximately one third of the length of the groove 148. Additionally, the tapered portion 148 extends along its length at an angle of 5°–45°, but any appropriate angle may be used. In order to improve the method of assembly of the throttle body, the tapered portion 148a is preferably located adjacent to an end of the groove 148.

The deformable member 136 in this configuration is preferably a crush ring 136 having a substantially constant thickness across its length. More specifically, the first longitudinal end 166a of the crush ring 136 has a thickness 162a and the second longitudinal end 166b of the crush ring 136 has a thickness 162b that is substantially equal to the thickness 162a. As a result of the substantially constant thickness and a generally flush connection between the crush ring 136 and the throttle shaft 112, the crush ring 136 effectively has a tapered portion 136a corresponding to the groove tapered portion 148a and a straight portion 136b corresponding to the groove straight portion 148b. The crush ring tapered portion 136a eases insertion of the crush ring 136 into the bearing 26, similarly to that discussed above with another configuration.

Figure 6:
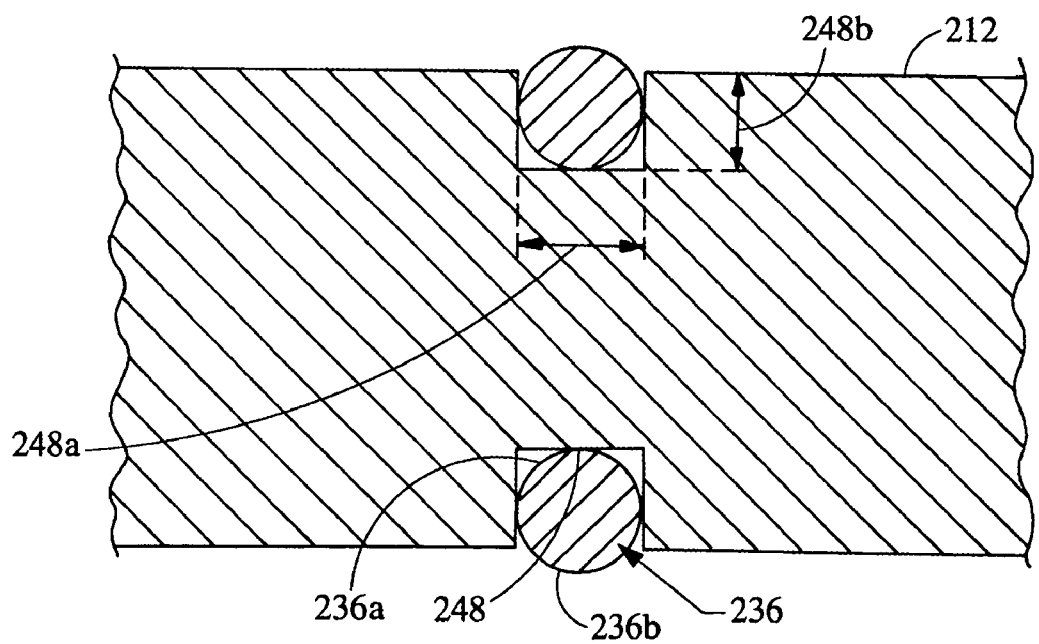
FIG. 6 is another alternative embodiment of a throttle shaft and a deformable member embodying the principles of the present invention.

Referring now to FIG. 6, yet another alternative configuration of a throttle body embodying the principles of the present invention will now be discussed. The throttle shaft 212 shown in FIG. 6 includes a groove 248 having a groove width 248a and a groove depth 248b. Furthermore, a deformable member 236 is referred to as a crush ring 236 located within the groove 248. The crush ring 236 has a generally circular cross-section, but other configurations may be used. A portion 236a of the crush ring 236 is located within the groove 248 and a portion 236b of the crush ring 236 extends outside of the groove 248 in order to be deformed by the press-fit connection with the bearing during assembly.

The diameter of the crush ring 236 is preferably substantially equal to the groove width 248a such that the crush ring 236 is substantially secured within the groove 248 during assembly. Furthermore, the groove 248 preferably has generally squared corners such that gaps exist between the respective groove corners and the crush ring 236. Thus, the crush ring 236 is able to expand into the gaps during deformation. Due to the groove width 248a being substantially equal to the diameter of the crush ring 236, the groove depth 248b is preferably smaller than the groove width 248a such that the portion 236b extends outside of the groove 248.

The crush ring 236 is preferably comprised of a wire, such as an aluminum wire. Similar to the tapered section discussed above, the arcuate shape of the portion 236b of the crush ring 236 extending outside of the groove 248 eases insertion of the crush ring 236 into the bearing.

Alternative configurations of the throttle body discussed above may be used with the present invention. For example, the deformable member may comprise a plurality of components located at various points around the throttle shaft.

It is therefore intended that the foregoing detailed description be regarded as illustrative rather than limiting, and that it be understood that it is the following claims, including all equivalents, that are intended to define the spirit and scope of this invention.

The invention claimed is:

1. A throttle body for an automobile comprising:
   a throttle shaft defining a rotational axis;
   a housing having a bore, the throttle shaft extending through the bore;
   a deformable member located on the throttle shaft and at least partially-located within the bore; and
   a bearing having an inner surface and an outer surface, the bearing inner surface forming a press-fit connection with the deformable member to substantially prevent movement between the throttle shaft and the bearing in a direction parallel to the rotational axis.

2. A throttle body as in claim 1, wherein the deformable member is at least partially located within a groove of the throttle shaft.

3. A throttle body as in claim 2, wherein the deformable member is at least partially-located between the bearing inner surface and the throttle shaft.

4. A throttle body as in claim 3, wherein the deformable member has a first thickness at a first point along the rotational axis and a second thickness at a second point along the rotational axis, wherein the second thickness is greater than the first thickness.

5. A throttle body as in claim 4, further comprising a throttle plate connected to the throttle shaft, wherein the first point is located a first distance from the throttle plate, the second point is located a second distance from the throttle plate, and the first distance is greater than the second distance.

6. A throttle body as in claim 4, wherein the groove has a substantially constant diameter.

7. A throttle body as in claim 3, wherein the groove has a first diameter at a first point along the rotational axis and a second diameter at a second point along the rotational axis, wherein the second diameter is greater than the first diameter.

8. A throttle body as in claim 7, further comprising a throttle plate connected to the throttle shaft, wherein the first point is located a first distance from the throttle plate, the second point is located a second distance from the throttle plate, and the first distance is greater than the second distance.

9. A throttle body as in claim 7, wherein the deformable member has a substantially constant thickness along the rotational axis.

10. A throttle body as in claim 3, wherein the deformable member includes a generally-circular ring.

11. A throttle body as in claim 10, wherein the generally-circular ring includes a slot extending therethrough.

12. A throttle body as in claim 11, wherein the slot extends at an angle substantially nonparallel to the rotational axis.

13. A throttle body as in claim 3, wherein the deformable member includes a wire having a generally-circular cross-section.

14. A throttle body as in claim 1, wherein the deformable member comprises an aluminum material.

15. A method of assembly of a throttle body for an automobile comprising:
   providing a throttle shaft defining a rotational axis;
   providing a housing having a bore;
   positioning a deformable member on the throttle shaft;
   extending at least a portion of the throttle shaft through the bore of the housing;
   providing a bearing having an inner surface and an outer surface; and
   coupling the bearing inner surface with the deformable member such as to form a press-fit connection and to substantially prevent movement between the throttle shaft and the bearing in a direction parallel to the rotational axis.

16. A method of assembly as in claim 15, further comprising the step of at least partially inserting the deformable member within a groove of the throttle shaft.

17. A method of assembly as in claim 16, further comprising the step of positioning the deformable member at least partially between the throttle shaft and the bearing inner surface.

18. A method of assembly as in claim 17, further comprising the step of plastically deforming a portion of the deformable member.

19. A method of assembly as in claim 18, wherein the step of coupling the bearing inner surface with the deformable member and the step of plastically deforming a portion of the deformable member occur substantially simultaneously.

20. A method of assembly as in claim 19, wherein the throttle shaft remains substantially undeformed during the assembly of the throttle body.

* * * * *